United States Patent [19]

Comfort et al.

[11] 4,374,414
[45] * Feb. 15, 1983

[54] ARBITRATION CONTROLLER PROVIDING FOR ACCESS OF A COMMON RESOURCE BY A DUPLEX PLURALITY OF CENTRAL PROCESSING UNITS

[75] Inventors: Joseph A. Comfort; Thomas J. Perry; Michel Loos, all of Phoenix, Ariz.

[73] Assignee: GTE Automatic Electric Labs Inc., Northlake, Ill.

[*] Notice: The portion of the term of this patent subsequent to Dec. 7, 1999, has been disclaimed.

[21] Appl. No.: 163,046

[22] Filed: Jun. 26, 1980

[51] Int. Cl.³ .................. G06F 13/00; G06F 15/16
[52] U.S. Cl. .................................................. 364/200
[58] Field of Search ... 364/200 MS File, 900 MS File, 364/187; 371/9

[56] References Cited

U.S. PATENT DOCUMENTS

| | | | |
|---|---|---|---|
| 3,303,474 | 2/1967 | Moore et al. | 371/9 X |
| 3,444,528 | 5/1969 | Lovell et al. | 371/9 |
| 3,521,238 | 7/1970 | Gunderson | 364/200 |
| 3,636,331 | 1/1972 | Amrehn | 364/187 |
| 3,699,529 | 10/1972 | Beyers et al. | 364/200 |
| 3,806,885 | 4/1974 | Moore | 364/200 |
| 3,882,455 | 5/1975 | Heck et al. | 371/9 |
| 4,096,571 | 6/1978 | Vander Mey | 364/200 |
| 4,133,027 | 1/1979 | Hogan | 364/187 |
| 4,141,066 | 2/1979 | Keiles | 364/187 X |
| 4,159,518 | 6/1979 | Draper et al. | 364/200 |
| 4,164,787 | 8/1979 | Aranguren | 364/200 |
| 4,171,536 | 10/1979 | Hever et al. | 364/200 |
| 4,191,996 | 3/1980 | Chesley | 371/9 |
| 4,228,496 | 10/1980 | Katzman et al. | 364/200 |

FOREIGN PATENT DOCUMENTS

| | | | |
|---|---|---|---|
| 54-159839 | 12/1979 | Japan | 371/9 |
| 2032149 | 4/1980 | United Kingdom | 371/9 |

Primary Examiner—Mark E. Nusbaum
Assistant Examiner—William G. Niessen
Attorney, Agent, or Firm—Robert J. Black; Frank J. Bogacz

[57] ABSTRACT

An arbitration controller providing for equal priority sharing of duplicate copy resources by a duplex plurality of central processing units. Conflicts resulting from simultaneous requests from several CPUs for access to the common resource are resolved at a high rate of speed. In addition, an approximately statistically equal probability is maintained for access of the common resource by all the central processing units.

14 Claims, 4 Drawing Figures

ARBITRATION CONTROLLER PROVIDING FOR ACCESS OF A COMMON RESOURCE BY A DUPLEX PLURALITY OF CENTRAL PROCESSING UNITS

CROSS-REFERENCE TO RELATED APPLICATIONS

The present application is related to co-pending U.S. patent applications Ser. Nos. 163,044; 163,045; 163,047; 163,048 and 163,049, all assigned to the same assignee.

BACKGROUND OF THE INVENTION (1) Field of the Invention

The present invention pertains to multi-central processing unit controlled real time systems and more particularly to an arbitration scheme for resolving conflicting requests from the central processing units for access to a commonly shared resource.

(2) Description of the Prior Art

Computer control has been applied to a vast number of real time process control systems. For example, central processing units (CPUs) control the real time switching operation in modern telephone central offices. Historically, large CPUs have been developed to provide the control function for large telephone central offices.

Due to the public policy of requiring telephone switching centers to operate 24 hours a day continuously without disruption of service, highly reliable switching systems are desirable. This requirement provides added complexity when dealing with CPU common controlled switching systems.

In more recent times, large central processing units have given way to distributed processing schemes. In such schemes, numbers of smaller central processing units cooperate to perform the control functions, thereby increasing the overall flexibility of such a system and providing for modular expansion. In the telephone central office example, many smaller central processor units working together can handle telephone traffic more efficiently and economically than a single large central processing unit. Microprocessor CPUs are specially suited to such an operation.

In distributed processing systems where there are a number of central processing units, these CPUs may typically exchange information in order to perform one overall task. One solution to the information exchange problem is to have two CPUs talk directly to one another. In such a configuration, each CPU must stop any other tasks which it may be performing establish a direct link via a defined protocol scheme and then transmit the required information.

In another solution, the CPUs may asynchronously place information in a predefined resource, so that the CPU which is to receive the information may remove it at its own particular available time. In sharing a common resource, a problem of allocation of the resource to a particular CPU arises. That is, a number of CPUs may request to deposit or retrieve information simultaneously. Therefore, conflicts arise and these conflicts of access must be resolved. Previous access schemes involved scanning signals for request or allocating certain time slots in which each processor may access the resource. Such systems are time consuming and inefficient and further they allow monopolization of the resource by a particular CPU of the group.

Accordingly, it is an object of the present invention to provide an arbitration controller for providing equal priority sharing of a common resource by a duplex plurality of CPUs.

It is a further important objective of the present invention to provide such a controller which prohibits monopolization of the common resource by a particular CPU.

It is another important objective of the present invention to provide for the arbitration of simultaneous access by CPUs at a very rapid rate in order to allow an efficient information exchange.

It is another important objective of the present invention to provide for an approximately statistically equal probability of each CPU for obtaining access to the resource.

It is still another important objective of the present invention to provide for a highly reliable configuration for CPU arbitration in order to prevent switching system disruption due to equipment failure.

It is yet another important objective of the present invention to provide an arbitration controller which may grow in the number of CPUs, which are subject to control, in an efficient and economical manner.

SUMMARY OF THE INVENTION

The present invention comprises an arbitration controller providing for equal priority sharing of a duplicate copy resources by a duplex plurality of CPUs. These CPUs communicate with one another by transmitting information asynchronously to the common resource and retrieving information deposited therein by the other CPUs. One resource, comprising two identical copies, can operate with only one CPU at one time. Therefore, each active CPU is connected to a duplex pair of arbitration circuits and the connections between each CPU and these arbitration circuits each comprise a tri-state bus arrangement. Each arbitration circuit is connected to a corresponding copy of the resource via a separate common tri-state bus. Due to the large number of CPUs employed and physical limitations, the CPUs and corresponding arbitration circuits are grouped into two subgroups.

Each subgroup of arbitration circuits comprises two parallel arbitration groups operating synchronously. Within each subgroup of a group, each arbitration circuit is connected to the next successive arbitration circuit, with the last arbitration circuit being connected to the first, thereby forming a ring connection for each subgroup. An initialization signal is applied to the first arbitration circuit of each subgroup and a bus available signal is derived from it and is propagated along each ring connection in a circular of fashion. Each of the two parallel arbitration groups are synchronized for this operation. When a CPU requests an access to the common resource, a signal is transmitted via the tri-state bus between the CPU and a corresponding arbitration circuit in each arbitration group. Since the bus available signal moves along the completed ring connection at a high rate of speed, in a very short time the bus available signal will enter the logic of the arbitration circuit corresponding to the CPU which has made the common resource request. The signals are synchronously analyzed by corresponding arbitration circuit of each group and the requesting CPU is given access to both common tri-state buses connected to the respective copies of the common resource. The CPU then proceeds with the information exchange and other CPUs must wait.

When two or more CPUs of one subgroup simultaneously request access to the common resource, the next CPU which has an active common resource request and sequentially obtains the bus available signal will gain control of the duplicate common resources via an arbitration circuit of each parallel group. The bus available signal travels at a high rate of speed slowed only by a single gate propagation time, if no requests for the common resource are active. The probability of any CPU gaining access to the common resource is statistically equal to that of any other CPU. Each CPU of the duplex pair is allowed only one access cycle to the common resource and then must relinquish control of the resource. In this way, one CPU is prohibited from monopolizing the resource for a long period of time.

When two CPUs located in the different subgroups simultaneously request access to the common resource, the arbitration of this conflicts is resolved by two synchronously operating switching circuits. The essence of these switching circuits is to operate when CPUs in two subgroups simultaneously request access to the resource, to choose one or the other. The switching circuits alternate their selection at a high rate of speed so the choice is nearly random. Both switching circuits operate to select the same subgroup, so that the access to both copies of the duplex resource is nearly simultaneous. If only one CPU requests, the switching circuit need not choose and simply allocates the resource. When the circuit must choose, the periodic pulses of an input clock signal provide the selection of which subgroups has first access. Access is then alternately allocated.

After the completion of one access cycle to the common resource, other CPUs of each subgroup will sequentially be granted the access to the duplicate copy resources. If other CPUs of a subgroup have active requests, they will be serviced in a sequential fashion similar to that as described above.

While one CPU is accessing the resource, and if no other CPUs of that subgroup have active common bus request signals, the bus available signal will propagate along the ring connection of each subgroup and back to the CPU which is currently accessing the resource. The propagation of the bus available signal will not be halted, because other common bus request signals may have become active in the intervening propagation time. Therefore, the arbitration circuit will re-propagate the bus available signal, so that the next common bus request can be established simultaneously with the processing of the current resource access. In addition, this scheme of repropagating the bus available signal prevents a particular CPU from making two consecutive resource accesses.

In each parallel group of each subgroup if the bus available signal returns to the arbitration circuit making a resource access, a take grant signal is generated to automatically allow the next sequential arbitration circuit of each subgroup to access the resource if it has an active request. This occurs simultaneously for an arbitration circuit of each parallel group. This take grant signal is important when no other CPUs have an active request because it prevents one arbitration circuit from multiple consecutive accesses and distributes determination of which is the next available resource request in the subgroup to be given access on a rotational basis. This scheme keeps resource access equal when CPU requests are few and sporadic.

Optionally, each arbitration circuit provides its associated CPU with the ability to hold the access of the resource for more than one cycle.

Each CPU of the plurality has an associated ready-standby CPU. Only one of the duplex pair is active at one time. The other CPU is ready to become active should a fault occur in the active CPU. Both CPUs of the duplex pair have full access to each copy of the resource via cross connection of the tri-state buses between the CPUs and the two parallel rings of arbitration circuits.

Operation of each arbitration group and each copy of the resource are synchronized, so that the integrity of information stored or retrieved from memory is maintained.

DESCRIPTION OF THE DRAWINGS

FIGS. 1A and 1B are to be placed side by side with FIG. 1A on the left and FIG. 1B on the right.

DESCRIPTION OF THE PREFERRED EMBODIMENT

Figure 1A:
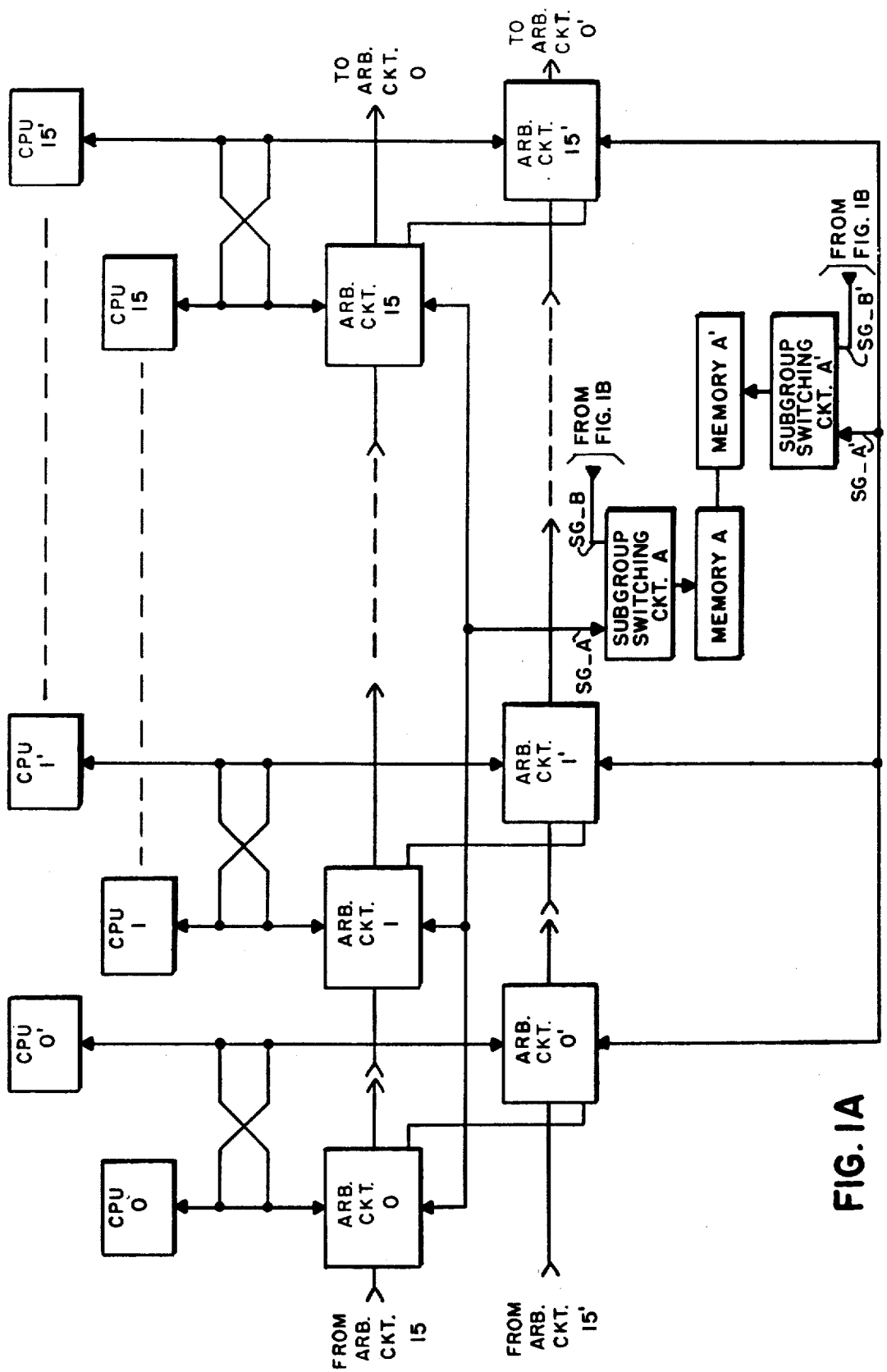
FIGS. 1A and 1B comprise a block diagram of an arbitration controller providing equal priority sharing of a common resource by a plurality of CPUs.
Figure 1B:
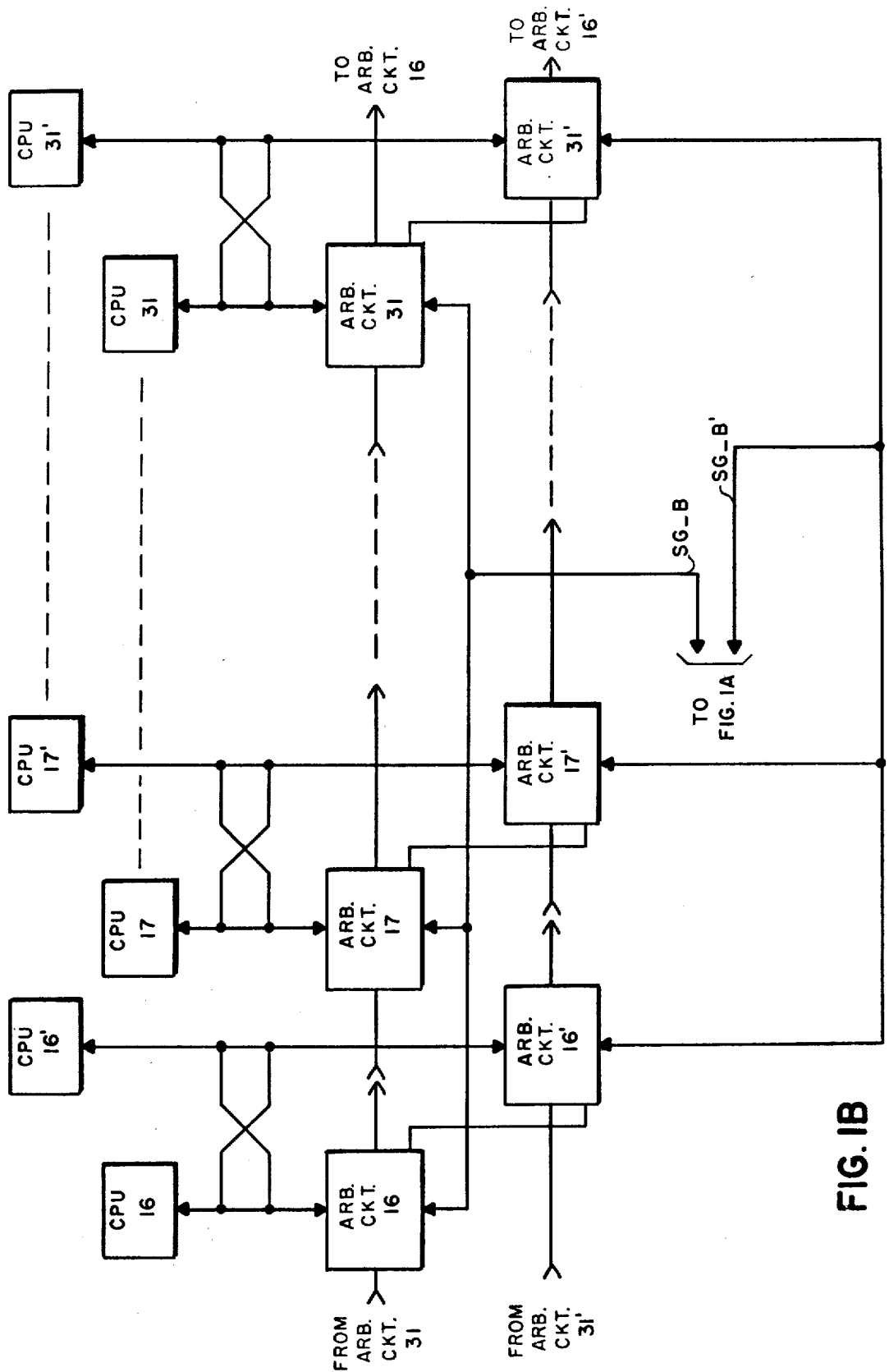

Referring to FIGS. 1A and 1B, an arbitration controller apparatus is shown, such apparatus being shown in a duplex form. The present application teaches duplex arbitration control. Simplex arbitration control is taught in co-pending sister application Ser. No. 163,045.

Each central processing unit (CPU) 0-15, 0'-15', 16-31 and 16'-31' is shown connected via a tri-state bus to a corresponding arbitration circuit 0-15, 0'-15', 16-31 and 16'-31' respectively. CPUs 0 and 0', 1 and 1', etc. constitute duplex pairs, having one CPU of the pair active and the other a ready-standby for fault failure of the active one. Each CPU of the pair has its buses cross connected to the other arbitration circuit of the pair. (That is, CPU 0 is connected via buses to arbitration circuits 0 and 0', CPU 0' is connected via buses to arbitration circuits 0' and 0. CPU 1 is connected to arbitration circuits 1 and 1', CPU 1' is connected to arbitration circuits 1' and 1, etc.) However, only one CPU of the pair is active at one time. The buses are enabled only from the active CPU via tri-state driver elements. Due to physical constraints, CPUs 0-15 and 0'-15' each comprise one subgroup and CPUs 16-31 and 16'-31' each comprise another.

Each arbitration circuit 0-15, 0'-15', 16-31 and 16'-31' is in turn connected via a corresponding common tri-state bus to memory A and to its duplicate copy memory A'. Arbitration circuit 0 is connected to arbitration circuit 1 with arbitration circuit 1 being connected to the last arbitration circuit 15 of the subgroup and the last arbitration circuit connected back again to arbitration circuit 0, thereby forming a completed ring connection. Arbitration circuit 0' is connected to arbitration circuit 1' with arbitration circuit 1' being connected to the last prime arbitration circuit 15' of the subgroup and the last prime arbitration circuit 15' connected back again to arbitration circuit 0', thereby forming a second parallel and synchronously operated ring connection.

Arbitration circuit 16 is connected to arbitration circuit 17 with arbitration circuit 17 being connected to the last arbitration circuit 31 of the subgroup and the last arbitration circuit 31 connected back again to arbitration circuit 16. Arbitration circuit 16' is connected to arbitration circuit 17' with arbitration circuit 17' being connected to the last arbitration circuit 31' of the subgroup and the last arbitration circuit 31' connected back again to arbitration circuit 16', thereby forming two parallel and synchronously operated ring connections. There is an exact correspondence between each group of arbitration circuits. The number of arbitration circuits of each ring connection is in direct relation to the number of CPUs in the configuration.

The configuration may contain as many as 32 pairs of central processing units (each may comprise an INTEL 8086 or similar device) and therefore, 32 pairs of arbitration circuits. The number of CPUs is expandable from 2 pairs to a total of 32 pairs in this implementation. As a practical matter, at least two pairs of CPUs are required for the function of telephone central office switching.

When an initialization signals is applied to arbitration circuit 0, 0', 16 and 16' bus available signals are derived and each is propagated along to successive arbitration circuits of its subgroup ultimately returning to arbitration circuit 0, 0', 16, and 16' where it is again propagated. When, for example, CPU 0 requests access to memory A and A', arbitration circuit 0 and 0' each receive a request signal via their respective buses. And as the bus available signal is propagating through the logic of arbitration circuit 0 and synchronously through the logic of arbitration circuit 0', arbitration circuit 0 and 0' will each temporarily block the propagating of the bus available signal. As a result, CPU 0 will have control of each of the common buses between the arbitration circuits 0 and 0' and can access memory A and A' synchronously. CPU 0 then performs parallel memory accesses to memories A and A' of a duration of one memory cycle while simultaneously re-propagating the bus available signal in each ring connection to the next sequential arbitration circuit 1 and 1'. This operation is analogous for CPU 16 and arbitration circuits 16 and 16' accessing memory A and A'.

The bus available signals travel along each ring connection of arbitration circuits 0-15, 0'-15', 16-31 and 16'-31' at a relatively high rate of speed, so that the probability of any active CPU gaining access to memory A and A' is relatively equal among the active CPUs. Each arbitration circuit of a subgroup slows the propagation of the bus available signal only by the time required to propagate this signal through a high speed gating arrangement of each ring connection.

When two or more active CPUs of duplex pairs in one subgroup simultaneously request access to memory A and A', a conflict situation arises. This conflict is arbitrated by means of the two parallel ring connections of arbitration circuits. The bus available signal propagates along each ring connection of arbitration circuits. If an arbitration circuit pair (0 and 0') has an active request for access to the common bus of memory A and A', CPU 0 associated with these arbitration circuits is then given control of each common bus enabling the memory transfer to occur. Since, the conflict was with a subgroup and arbitrated by the ring connection of arbitration circuits, subgroup switching circuits A and A' operate only to gate through the bus connections to common memories A and A'. If CPU 0' is the active one of the pair the transfer will occur as above except that CPU 0 is replaced by CPU 0'.

During this time, each bus available signal is re-propagated to the next succeeding arbitration circuit pair 1 and 1' of each ring, so that CPUs 1 or 1' may establish their priority to obtain the common buses next. The associated CPU of this arbitration circuit pair then has control of each common bus and associated memory A and A'. Then the active CPU of the duplex pair performs its memory transfer operation. The arbitration occurs sequentially as described above until all outstanding requests for access to memory A and A' have been serviced.

While a particular CPU has been granted access to memory A and A', the bus available signals will be re-propagated by each of its corresponding arbitration circuits of the subgroup. Other active CPUs will have the opportunity to establish a priority for service before a memory request will be granted to the same CPU of the subgroup. If the bus available signal returns to the arbitration circuit pair presently in control of the duplicate memories, grant signals will automatically pass control of the grant of access to the next sequential arbitration circuit pair. Thereby, a particular active CPU does not utilize its arbitration circuit to monopolize memory A and A'.

When two CPUs of duplex pairs located in different groups and subgroups, for example CPU 0 and CPU 16, simultaneously request access to the memories A and A', arbitration of this conflict is resolved by subgroup switching circuits A and A'. Switching circuits A and A' synchronously operate to select CPU 0 or 16 randomly and then alternates access to memories A and A' from one subgroup to the other subgroup, for example first CPU 0, next CPU 16, next CPU 1, next CPU 17, etc. The order within a subgroup need not be sequential. If only one CPU is requesting, switching circuits A and A' simply allocate memories A and A' to that CPU. When switching circuits A and A' must choose between CPUs of different subgroups, the initial choice is established by a periodic pulse input signal selecting one group. Access is then alternately allocated between groups.

However, optionally each active CPU of a duplex pair may lockout other active CPUs for more than one memory cycle. Such conditions are limited and closely monitored.

Figure 2:
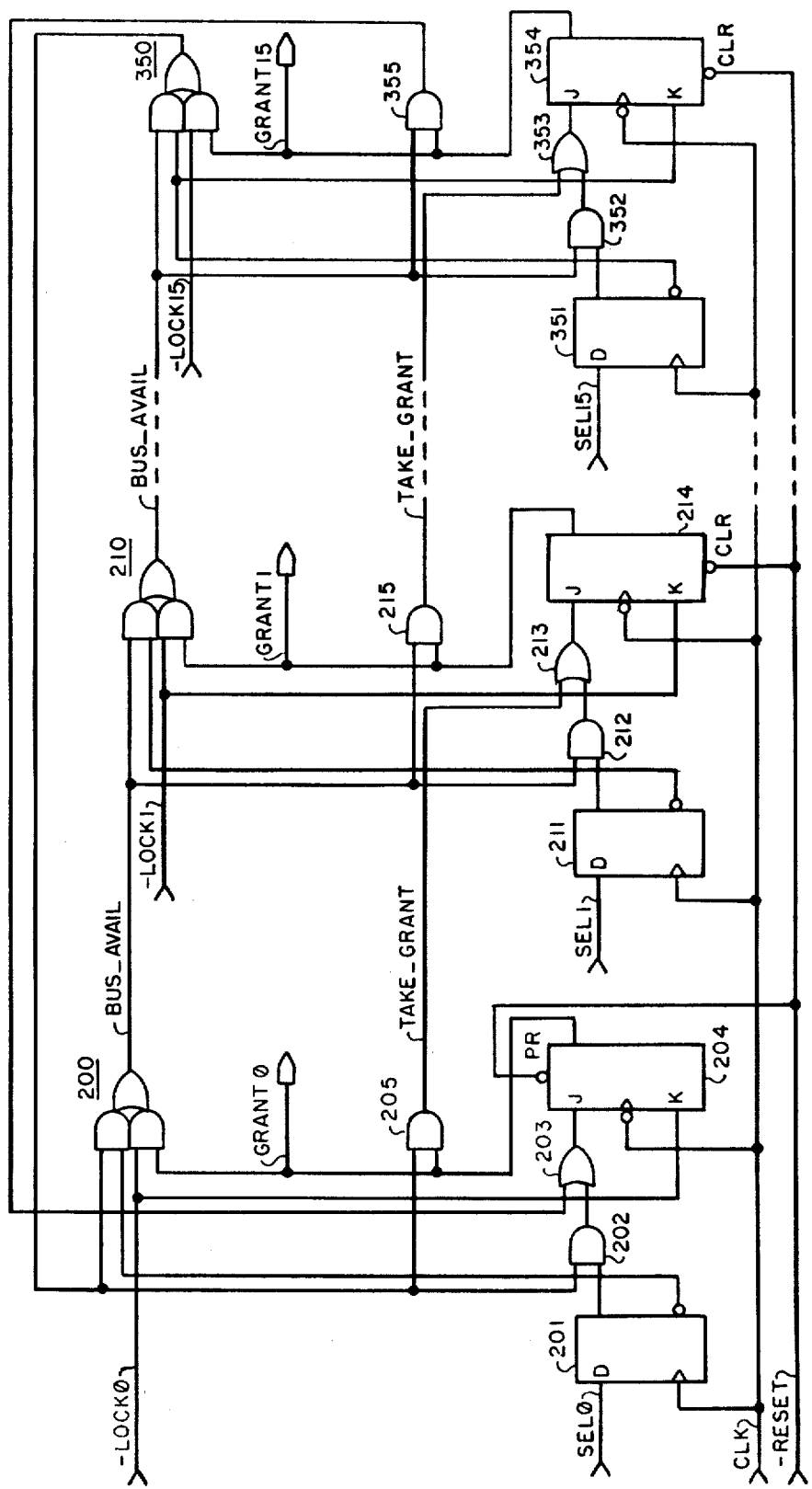
FIG. 2 is a schematic diagram embodying of the principles of operation of an arbitration circuit.

Referring now to FIG. 2, a schematic diagram of three arbitration circuits of one subgroup of a group is shown. These circuits correspond to a first a second and a last arbitration circuits of one of the two parallel ring connections. A particular implementation may include up to 16 pair of arbitration circuits per subgroup, one pair for each CPU pair equipped in the configuration. Thereby, a maximum configuration of 32 pair of CPUs and 32 pair of arbitration circuits is capable of implementation via this scheme. The operation will be explained for one arbitration subgroup of ring connection for simplicity. It is to be noted the same operation synchronously occurs in a corresponding parallel arbitration group. That is, arbitration circuits 0-15 and 0'-15' operate synchronously forming duplex subgroups. In addition, arbitration circuits 16-31 and 16'-31' operate synchronously forming another pair of duplex subgroups. Thereby, both memory copies A and A' are written to or read from simultaneously. In the operation either CPU of the pair may be active, for example, CPU 0 or 0' and 16 or 16'.

Each arbitration circuit includes a gating arrangement composed of an AND-OR gate 200, which may be implemented via an integrated circuit part number 74S51 or similar device. A ring connection of gates 200, 210, etc. propagates the bus-avail signal from one arbitration circuit to the next at a relatively high rate of speed so that the signal is not inhibited by any single arbitration circuit for a substantial period of time.

D-Type flip-flop 201, 211 and 351 are each connected between a respective CPU and its respective arbitration logic. Gates 201, etc. may be implemented via integrated circuit part number 74S74. JK flip-flop 204, 214, etc. are each connected between their corresponding D-type flip-flops 201, 211, etc. and their corresponding AND-OR gate 200, 210, etc.

As a portion of the system clear and initialization, CPU 0 pulses the reset lead which is connected to JK flip-flops 204, 214, etc. As a result the bus-avail signal is generated through AND-OR gate 200 and propagates along the ring connection to AND-OR gate 210, 350 and back gain to gate 200. A 12 MHZ clock signal, from a clock (not shown) is transmitted to all flip-flops (D-type and JK) via the CLK lead to operate each of these flip-flops.

An example will best serve to illustrate the granting of control of the common bus to a particular CPU. When active CPU 0 signals via the reset lead, flip-flop 204 is preset enabling gate 200 to transmit the bus available signal via the bus-avail lead to each successive gate 210, etc. When CPU 0 requests access to the common memory, CPU 0 raises the SEL 0 lead via the bus connected between CPU 0 and arbitration circuit 0. At the next clock cycle, the clock signal is transmitted to flip-flop 201 which becomes set and the $\overline{Q}$ output of this flip-flop temporarily disables gate 200 from passing the bus-avail signal. The Q output of flip-flop 201 is passed through gates 202 and 203 and sets flip-flop 204, which causes it to toggle and produce a signal on the grant 0 lead and simultaneously enables gate 205. The grant 0 lead is returned to CPUs 0 and 0' and this signal also enables tri-state elements (not shown), gating CPU 0 bus onto the common bus of memory A. The above simultaneously occurs in arbitration circuit 0'. While this memory access takes place, the bus available signal is re-propagated via the output of J-K flip-flop 204 through the lower portion of gate 200, so that the successive arbitration circuits may establish their respective priority for memory access.

If the bus available signal returns to arbitration circuit 0 via the bus-avail lead while the access is in progress, the grant signal is transmitted via the take-grant lead automatically to the next sequential arbitration circuit 1, so that if SEL 1 is set, CPU 1 access request will be given the grant on the next clock cycle. This scheme distributes determination of which is the next available memory request to be given access on a rotational basis; and this scheme further keeps memory access equal when CPU access requests are sporadic. In this way, a CPU may not make successive memory requests.

CPU 0 may now completes its data transfer to memory A and A'. If another arbitration circuit pair has established its priority, that circuit pair will receive control of the common buses next. In this way, while one CPU is accessing memories A and A', the next CPU is establishing its priority for service.

All buses are bidirectional and each directional link includes tri-state bus drivers which may be implemented via integrated circuit part number 74LS245. All above mentioned integrated circuits are manufactured by Texas Instruments Incorporated and various other manufacturers.

The CPU having the memory access grant may signal via the lock lead (normally high) to halt the re-propagation of the bus available signal and thereby hold memory access for longer than one cycle. This optional use is a rare circumstance and is closely monitored by the CPUs.

Figure 3:
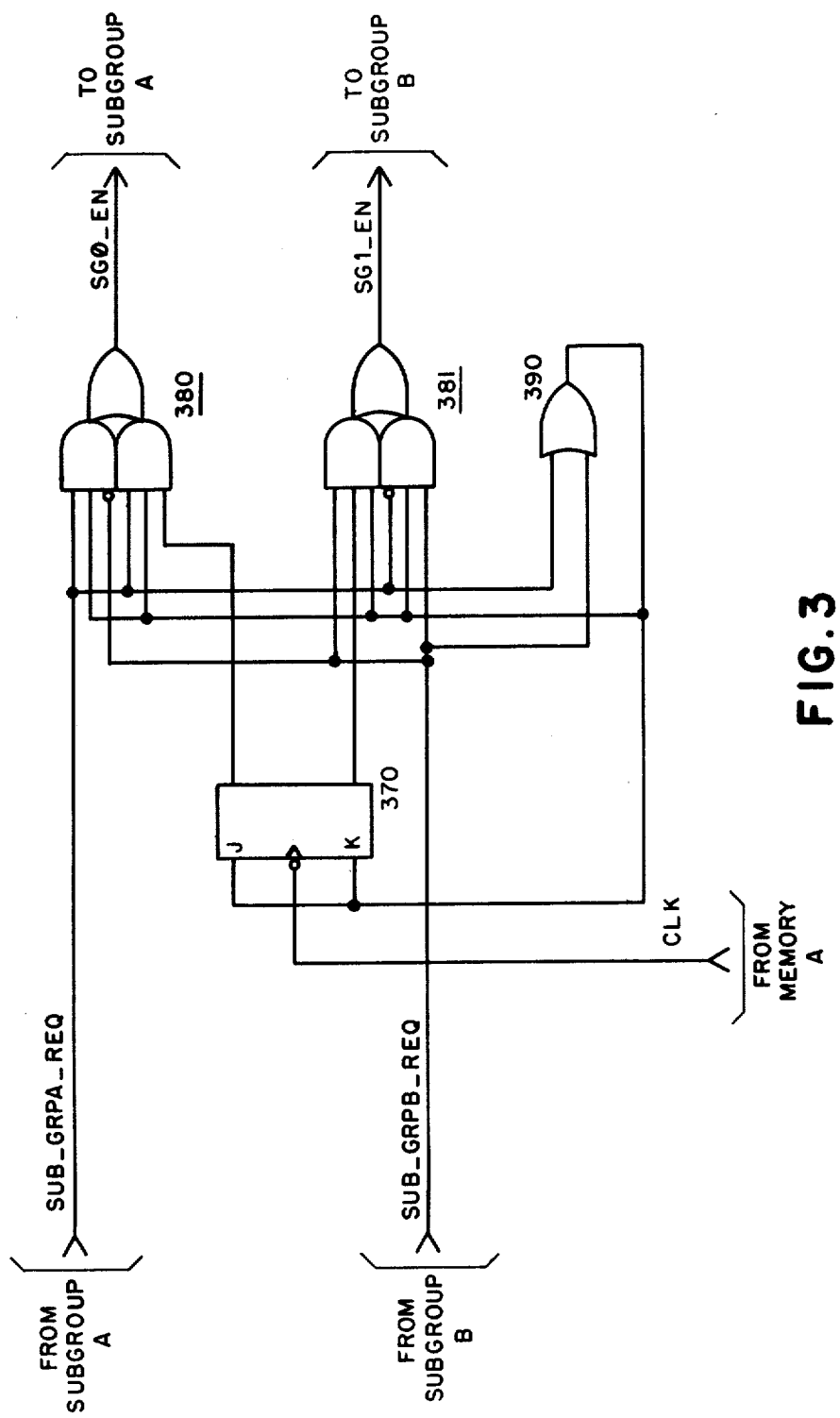
FIG. 3 is a schematic diagram of a subgroup switching circuit.

Referring to FIG. 3, a schematic diagram of subgroup switching circuit A and A' of FIG. 1A is shown. J-K flip-flop 370 is connected via the CLK lead to a clock (not shown) providing an 12 MHZ cycle clock signal, flip-flop 370 is further connected to each of AND-OR gates 380 and 381 and OR gate 390. If, for example, a CPU of subgroup A is the only one requesting, the upper AND gate of gate 380 is enabled and the CPU of subgroup A has its tri-state bus (not shown) enabled to access memory A.

When two CPUs, one from each subgroup (CPU 0 and CPU 16, for example), simultaneously request access to the memory, the upper portion of gate 380 and lower portion of gate 381 are disabled. On the next clock cycle via the CLK lead, flip-flop 370 will toggle to enable the lower portion of gate 380 or the upper portion of gate 381, thereby selecting subgroup A or B respectively. Only one subgroup is enabled to access memory and on the next clock cycle the remaining subgroup is enabled.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. An arbitration controller providing for equal priority sharing of duplicate copy resources by active ones of a plurality of duplicate pairs of CPUs, said arbitration controller comprising:
    first and second common buses, each bus including first and second portions;
    first and second switching means operated to provide alternate first and second selection signals;
    first and second arbitration groups, each of said groups including:
    first and second means for initialization, each providing a first signal;
    corresponding first and second pluralities of arbitration circuits, each plurality including a first, at least one successive and a last arbitration circuit;
    each of said means for initialization connected to at least one of said corresponding plurality of arbitration circuits;
    first and second pluralities of CPU buses each bus of each plurality connected between a particular CPU and said resources via a particular arbitration circuit on a one for one basis, each CPU bus including a control portion and an address/data portion;
    each of said buses of said first plurality connected to a particular one of said buses of said second plurality and each of said buses of said second plurality connected to a particular one of said buses of said first plurality;
    said first and second common buses, each common bus connected between said corresponding plurality of CPUs and a particular one of said duplicate copies of said resource via said corresponding arbitration circuits for the parallel transmission of information between said duplicate common resources and any said active one of said plurality of CPUs via said address/data portion of said corresponding CPU bus;

first and second pluralities of circuit connections, each plurality including a circuit connection between each first arbitration circuit and each successive arbitration circuit, each of said last arbitration circuits connected to said first arbitration circuit of its respective plurality, thereby forming first and second completed ring connections, each of said ring connections propagating a respective one of said first signals synchronously;

one arbitration circuit of each plurality simultaneously operated in response to its respective first signal and to a common bus request signal from said active CPU, each arbitration circuit producing a second signal for allowing said active CPU to access each of said duplicate copy resources simultaneously via said first and said second common buses respectively;

each of said first signals propagating through each of said corresponding plurality of arbitration circuits to successively enable said active ones of said CPUs to access said duplicate copies of said resource; and said first switching means connected between said first and second portions of said first common bus and one copy of said resource, said second switching means connected between said first and second portions of said second common bus and said duplicate copy of said resource, whereby said first and second switching means each operates in response to said first selection signal to enable access to a copy of said duplicate copy resources from said arbitration circuits of said first portion of each said common bus and operates to disable said access from said arbitration circuits of said second portion of each common bus and alternately, each said switching means operates in response to said second selection signal to enable said access from said arbitration circuits of said second portion of each said common bus and to disable said access from said arbitration circuits of said first portion of each common bus.

2. An arbitration controller as claimed in claim 1, wherein: each of said arbitration circuits of each plurality includes first gating means connected to said successive arbitration circuit and operated to propagate each said first signal along each said ring connection of corresponding arbitration circuits at a relatively high rate of speed whereby each active CPU of each said arbitration group is given an equal priority access to said resource by inhibiting said propagation of said corresponding first signal.

3. An arbitration controller as claimed in claim 1, wherein: each of said arbitration circuits of each plurality of each said arbitration group includes second gating means connected to said successive arbitration circuit of said ring connection and operated to propagate a third signal from each arbitration circuit to each successive arbitration circuit, whereby control of each of said common buses is given to said next successive arbitration circuit having said common bus request signal from its corresponding CPU.

4. An arbitration controller as claimed in claim 3, wherein: said first gating means is further connected to said duplicate pair of CPUs whereby said active CPU exclusively controls access to said duplicate copy resources.

5. An arbitration controller as claimed in claim 1, wherein: each of said arbitration circuits of each plurality of each said arbitration group further includes latching means connected to said duplicate pair of CPUs and operated in response to said common bus request signal of said active CPU to produce said second signal allowing said active CPU to access said duplicate copy resources via said first and said second common buses respectively.

6. An arbitration controller as claimed in claim 5, wherein: said latching means includes first and second flip-flops, said first flip-flop connected between said corresponding CPU and said second flip-flop, said second flip-flop connected to said first and said second gating means of said arbitration circuit, whereby said common bus request signal of said corresponding CPU is stored for arbitration.

7. An arbitration controller as claimed in claim 6, wherein: each of said flip-flops of each arbitration circuit includes a clock connection adapted to drive each of said flip-flops.

8. An arbitration controller as claimed in claim 1, wherein: each of said duplicate pairs of CPUs includes a first and a second CPU cross connection bus, said first CPU connected to a bus of said first plurality and to a bus of said second plurality via said first cross connection bus and said second CPU connected to a bus of said second plurality and to a bus of said first plurality via said second cross connection bus whereby said first CPU constitutes said active CPU and said second CPU constitutes a ready-standby CPU and alternatively said second CPU constitutes said active CPU and said first CPU constitutes a ready-standby CPU.

9. An arbitration controller as claimed in claim 1, wherein: each of said first corresponding plurality of arbitration circuits is connected to a particular one of said second corresponding plurality of arbitration circuits for synchronously operating each arbitration circuit of said first plurality with said corresponding arbitration circuit of said second plurality whereby each of said active CPUs is enabled to access each copy of said duplicate resources.

10. An arbitration controller as claimed in claim 1, wherein: each copy of said duplicate copy resources is connected to said other copy resource whereby each of said active CPUs access both copies of said resource synchronously.

11. An arbitration controller as claimed in claim 1, wherein: each said switching means includes
a flip-flop;
gating means connected between said flip-flop and said first and second portions of said common bus, operated in response to said flip-flop and to simultaneous common bus request signals from said first and said second common bus portions to inhibit access of said resource by said first arbitration group and alternately operated to inhibit accesses of said resource by said second arbitration group.

12. An arbitration controller as claimed in claim 11, wherein: said flip-flop of each said switching means further includes a clock connection to an external clock whereby said flip-flop is operated in response to said clock at a relatively high rate of speed to allow an equal priority access to said resource from CPUs of said first arbitration group and alternately from CPUs of said second arbitration group.

13. An arbitration controller as claimed in claim 11, wherein: said gating means of each said switching means includes first and second gates, each gate connected to said flip-flop and to said first and second common bus portions of one said common bus; said first gate operated to enable access to said one of said duplicate copy resources by said first arbitration group and said second gate simultaneously operated to inhibit said access to said resource by said second arbitration group, and alternately said first gate operated to inhibit said access to said resource by said first arbitration group and said second gate simultaneously operated to enable said access to said resource by said second arbitration group.

14. An arbitration controller as claimed in claim 11, wherein: said gating means of each said switching means further includes a third gate connected to said first and second bus portions of one said common bus, to said flip-flop and to said first and second gates.

* * * * *